United States Patent [19]

Deppe et al.

[11] Patent Number: 4,866,410

[45] Date of Patent: Sep. 12, 1989

[54] THERMAL SENSOR ASSEMBLY

[75] Inventors: Gary L. Deppe; Richard E. Garrison, both of Mansfield, Ohio

[73] Assignee: Hi-Stat Manufacturing Company, Inc., Sarasota, Fla.

[21] Appl. No.: 225,212

[22] Filed: Jul. 28, 1988

[51] Int. Cl.[4] .................. H01C 7/00; G01R 27/02
[52] U.S. Cl. ........................... 338/28; 324/65 P
[58] Field of Search ............ 338/14, 28, 30, 36; 324/65 P

[56] References Cited

U.S. PATENT DOCUMENTS

| | | |
|---|---|---|
| 3,890,588 | 6/1975 | Kanaya et al. ............... 338/28 |
| 4,208,786 | 6/1980 | Merchant et al. ............. 338/14 X |
| 4,223,293 | 9/1980 | Springer et al. ............. 324/65 P X |

Primary Examiner—Donald A. Griffin
Attorney, Agent, or Firm—Lon H. Romanski

[57] ABSTRACT

A thermal sensor assembly is shown as having first and second body sections with the first being a probe-like portion for introduction into a medium the temperature of which is to be monitored; first and second thermistors, electrically isolated from each other are situated within the probe-like portion; the first thermistor is in series with and between two terminals which are connectable to associated circuitry external of the sensor assembly; the second thermistor electrically connected to a third terminal is effective to complete a circuit to ground potential through the probe-like portion.

16 Claims, 4 Drawing Sheets

THERMAL SENSOR ASSEMBLY

FIELD OF THE INVENTION

This invention relates generally to assemblies for sensing the thermal condition of a monitored area or medium and more particularly to such assemblies which, in response to sensed thermal conditions are effective for producing an attendant electrical signal.

BACKGROUND OF THE INVENTION

Heretofore, thermal sensors have been generally well known in the art. Some of such prior art sensors are of the type which are effective for opening and/or closing related electrical circuits upon sensing a preselected temperature or temperatures. Other of such prior art sensors are of the type which are effective for producing varying electrical signals which are related to or indicative of the magnitude of the sensed temperature.

Further, such prior art sensors may be of the type which in and of themselves provide for electrical grounding or may be of the type which are in series circuit as between a source of electrical potential and an associated electrical load.

In the automotive industry, in particular, the relatively recent trend has been to produce automotive vehicles which are lighter in weight as to thereby reduce the rate of fuel consumption. As a consequence, the entire automotive vehicle as well as the vehicular engine have become physically smaller. The engines, even though smaller, usually have a significantly higher operating R.P.M. and require the monitoring of many operating parameters as well as indicia of engine operation for assuring, among other things, proper fuel metering to the engine, ignition timing and the prevention of engine damage due to, for example, loss of engine oil or oil pressure or excessive engine temperature. In effect, even though the present automotive engines are physically smaller and situated within vehicular engine compartments which provide little space for access to the engine, the various areas or points of monitoring have increased with the result that the number or quantity of sensor assemblies have also increased to the point where it has become difficult to find areas of the engine which can accommodate all of such necessary sensor assemblies.

In some instances a single indicium of engine operation may be employed as a signal for two or more separate and distinct functions. For example, engine operating temperature may be employed for modifying the rate of metered fuel flow (as during cold engine start-up and drive-away) and may be employed for actuation of sensory warning devices so that the vehicle operator is made aware of the engine approaching or attaining an over-temperature condition. As should be apparent, the related electrical circuits leading as to the associated controls and/or warning devices are not compatible with each other. Therefore, in such situations the prior art has usually provided a separate sensor assembly and electrical circuit for each control and/or warning device. This has only aggravated the problem of finding sufficient space on the engine to accommodate all of such required sensor assemblies.

The invention as herein disclosed and described is primarily directed to the solution of the aforestated as well as other related and attendant problems.

SUMMARY OF THE INVENTION

According to one aspect of the invention, a thermal sensor assembly comprises housing means, said housing means comprising a first probe-like housing section and a second housing section, wherein said first housing section is intended for placement into a medium the temperature of which is to be monitored, a plurality of electrical terminal means carried by said second housing section for connection to associated electrical circuit means, first thermistor means situated within said first housing section as to be responsive to the temperature of said monitored medium, first electrical conductor means electrically interconnecting said first thermistor means to a first of said plurality of electrical terminal means, second electrical conductor means electrically interconnecting said first thermistor means to a second of said plurality of electrical terminal means, wherein said first and second electrical conductor means said first and second electrical terminal means and said first thermistor means comprise a series electrical circuit portion for connection to said associated electrical circuit means, second thermistor means situated within said first housing section as to be responsive to the temperature of said monitored medium, and third electrical conductor means electrically interconnecting said second thermistor means to a third of said plurality of electrical terminal means, wherein said second thermistor means is in electrically conductive relationship with said first housing section, wherein said first housing section is effective to be placed at electrical ground potential, and wherein said third electrical terminal means is effective for electrical connection to said associated electrical circuit means.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views.

DETAILED DESCRIPTION OF THE PREFERRED EMBODIMENT

Figure 1:
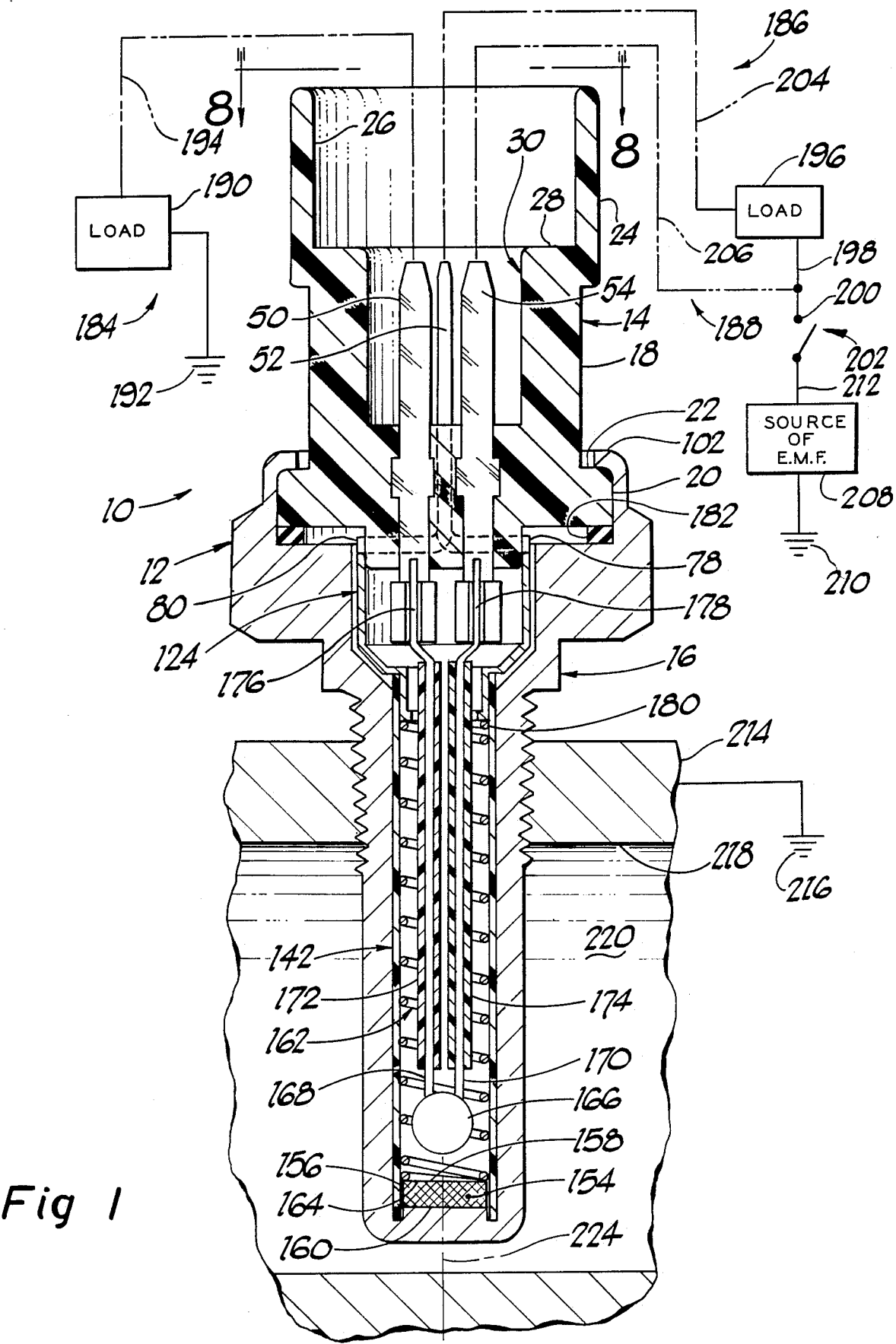
FIG. 1 is a generally axial cross-sectional view of a sensor assembly employing teachings of the invention along with schematically illustrated electrical circuitry associated therewith.

Referring now in greater detail to the drawings, FIG. 1 illustrates a sensor assembly 10 as comprising housing means 12, in turn, comprising an upper housing or body section or portion 14 and a lower housing section or portion 16. In the preferred embodiment upper body section 14 is comprised of suitable dielectric material and formed as to have generally cylindrical portions 18 and 20 with portion 20 being relatively larger as to provide for an annular shoulder or flange 22.

Figure 8:
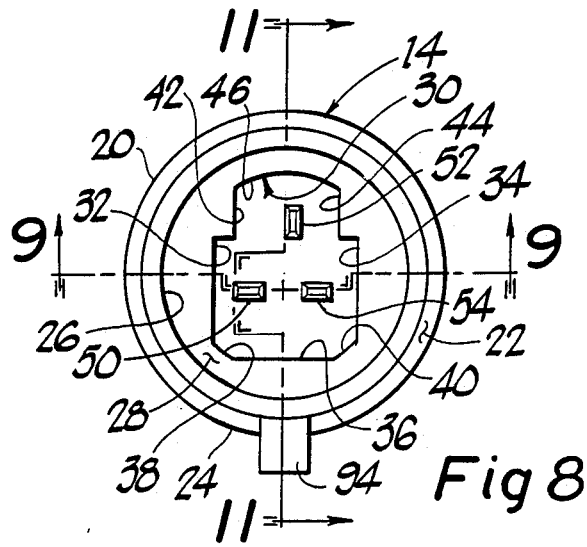
FIG. 8 is a view, in relatively reduced scale, taken generally on the plane of line 8—8 of FIG. 1 including, in the main, only the generally upper portion of the sensor of FIG. 1.
Figure 9:
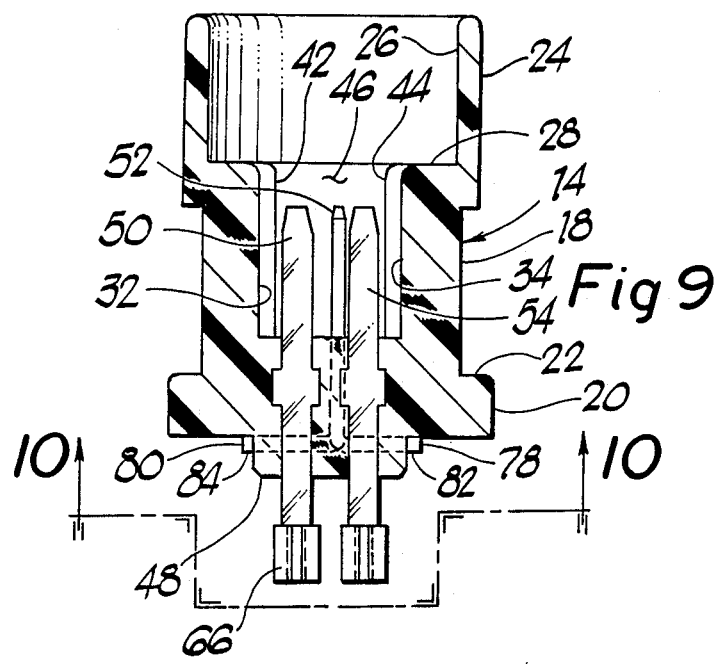
FIG. 9 is an axial cross-sectional view taken generally on the plane of line 9—9 of FIG. 8 and looking in the direction of the arrows.

Referring in particular to FIGS. 1, 8, 9, 10, 11 and 12, the upper housing or body section 14 is depicted as preferably comprising an upper generally cylindrical portion 24 which may be larger than adjoining lower portion 18 and which is provided with centrally situated axially extending bore or passage 26 terminating as at an inner flange or shoulder 28. A second or continued opening or passage 30 is formed further inwardly of passage 26 and is in general communication therewith. As best seen in FIGS. 8 and 9, the passage 30 is preferably configured as to be polarized and thereby receive a similarly shaped mating electrical plug (not shown) which carries socket like electrical contacts. More particularly, as best seen in FIGS. 8 and 9, the passage, opening or cavity 30 is depicted as comprising opposed generally flat walls 32 and 34, spaced from each other, a third generally flat wall 36 with angular wall portions 38 and 40 which collectively span the distance between and effectively join respective one ends of walls 32 and 34. A second pair of spaced opposed generally flat walls 42 and 44 are formed as to be spaced from each other a distance less than that by which walls 32 and 34 are spaced and are so positioned as to be inwardly of the planes containing walls 32 and 34. Walls 42 and 44 are effectively joined at their one ends to walls 32 and 34 as by respective generally transverse wall portions. The other ends of walls 42 and 44 effectively join into a spanning arcuate wall 46. As best seen in FIGS. 1, 9, 10 and 12, a generally cylindrical axially extending pilot portion 48 is formed at the lower end (as viewed in FIG. 9) of the body section 14. The body section 14 is preferably molded and in the process of molding electrical terminal members 50, 52 and 54, which may be comprised of brass, are molded in and retained by body section 14.

Figures 13, 14:
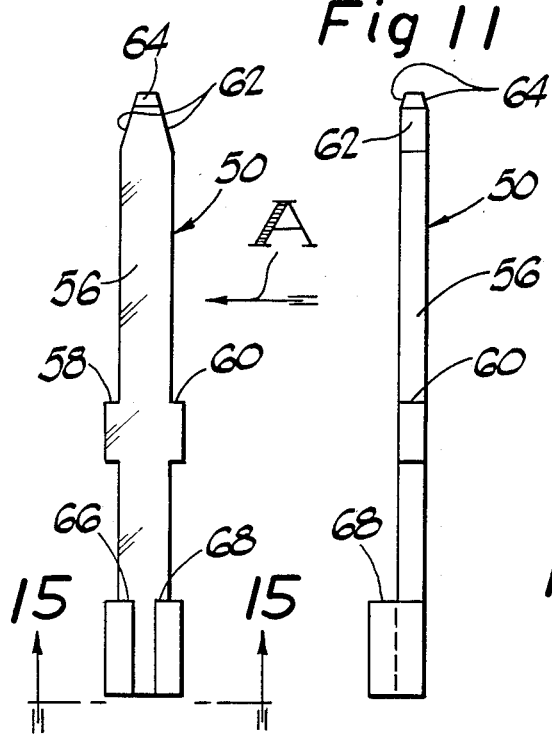
FIG. 13 is a relatively enlarged elevational view of one of the terminal elements shown in FIG. 1.
FIG. 14 is a view taken generally in the direction of arrow A of FIG. 13.
Figure 15:
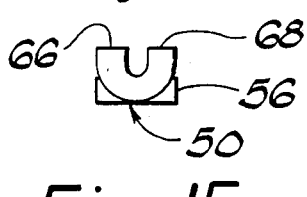
FIG. 15 is a view taken generally on the plane of line 15—15 of FIG. 13 and looking in the direction of the arrows.

Electrical terminals 50 and 54 may be effectively identical to each other and FIGS. 13, 14 and 15 illustrate terminal 50 the details of which may be considered as typical of both terminals 50 and 54. Referring in greater detail to FIGS. 13, 14 and 15, the terminal 50 is depicted as comprising a main blade-like body 56 with transversely extending integrally formed arm portions 58 and 60. The upper end (as viewed in FIG. 13) of terminal 50 may be tapered as at 62 and 64 to facilitate insertion thereof into a cooperating receiving contact of an associated electrical connector assembly. The lower end of body 56 has integrally formed and partially curled arms 66 and 68 which, upon receiving an electrical conductor therebetween, are crimped against such conductor in a manner well known in the art.

Figures 16, 17:
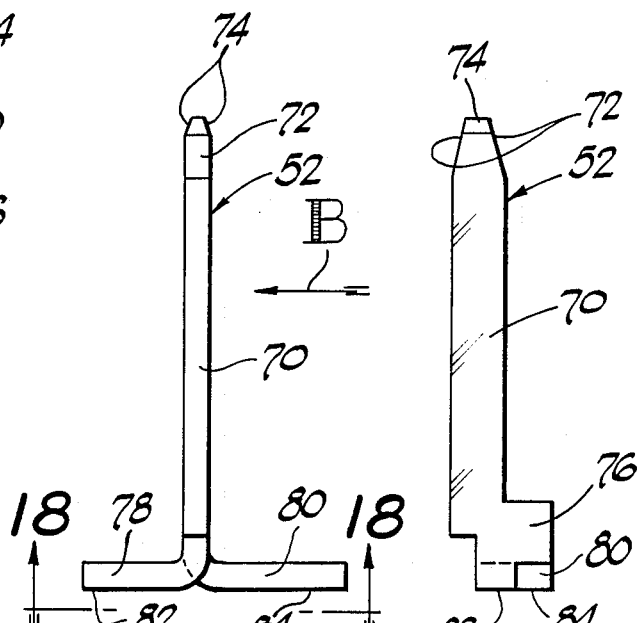
FIG. 16 is a relatively enlarged elevational view of another of the terminal elements shown in FIG. 1.
FIG. 17 is a view taken generally in the direction of arrow B of FIG. 16.
Figure 18:
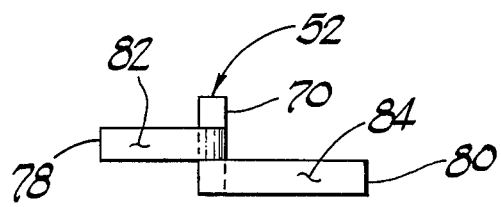
FIG. 18 is a view taken generally on the plane of line 18—18 of FIG. 16 and looking in the direction of the arrows.

Referring in greater detail to FIGS. 16, 17 and 18, terminal 52 is depicted as comprising a main blade-like body 70 which, at its upper end (as viewed in FIGS. 16 and 17), is preferably tapered as at 72 and 74 to facilitate insertion thereof into an associated electrical connector assembly. As best seen in FIG. 17, the lower end of body 70 is formed with a generally offset body portion 76 which, in turn, carries a pair of integrally formed legs 78 and 80 which are bent as to be extending in directions opposite to each other and as to have the respective lower surfaces 82 and 84 thereof generally coplanar.

When the upper body section 14 is formed and terminal 52 is at that time molded into body section 14, end portions of legs 80 and 78 extend beyond the cylindrical surface 49 of pilot portion 48 as shown in FIGS. 1, 9, 10, and 12. In the preferred embodiment, terminal 52 is located as to be somewhat offset and positioned closer to wall 44 than to wall 42 as best seen in FIGS. 8 and 9. Consequently, leg 80 is slightly longer than leg 78 as to compensate for such offset and still provide for an end portion thereof to extend beyond pilot portion cylindrical surface 49.

Figure 10:
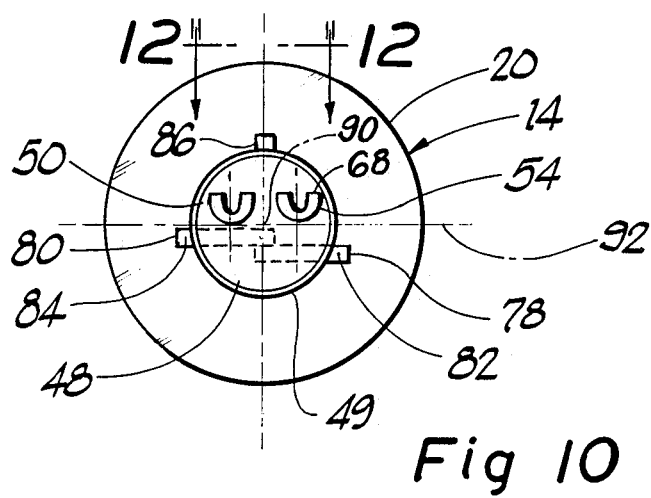
FIG. 10 is a view taken generally on the plane of line 10—10 of FIG. 9 and looking in the direction of the arrows.
Figure 12:
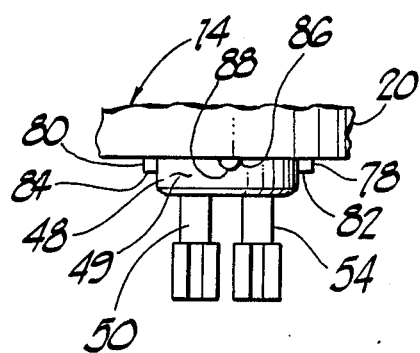
FIG. 12 is a view, with a portion broken away, taken generally on the plane of line 12—12 of FIG. 10 and looking in the direction of the arrows.

In molding the body section 14, a relatively short rib or boss 86 is integrally formed therewith as to be integral with the pilot portion 48 and the lower end of body portion 20 as best shown in FIGS. 10 and 12. In the preferred embodiment, the lower-most (as viewed in FIG. 12) surface 88 of boss 86 is coplanar with surfaces 84 and 82 of legs 80 and 78 with such plane being substantially normal to the center axis of body section 14.

As best shown in FIG. 10, the terminal 52 is so situated as to result in legs 78 and 80 being located substantially below (as viewed in FIG. 10) of the centerline represented at 92 and as to be angularly spaced from each other and from the boss or projection 86 about the center axis of body section 14. As will become evident, legs 80 and 78 along with boss or projection 86 provide for a three-point resting contact when assembled to form the assembly 10 of FIG. 1. Such three resting points may be equally angularly spaced from each other; however, in one successful embodiment projecting end of leg 80 was spaced in the order of 110° from projection 86 while the projecting end of leg 78 was spaced 120° from projection 86.

Figure 11:
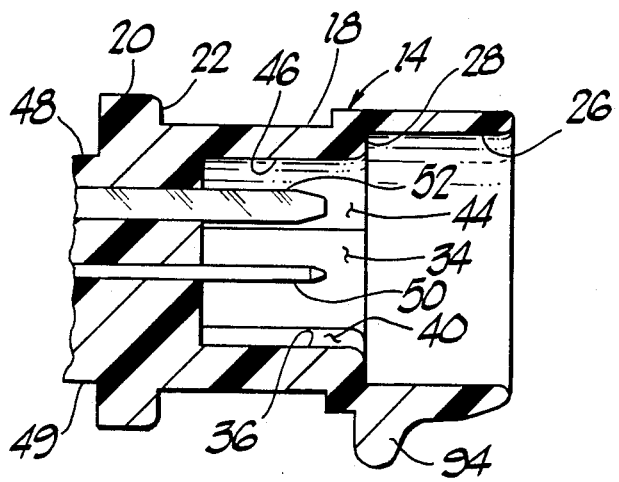
FIG. 11 is a cross-sectional view, with a portion broken away, taken generally on the plane of line 11—11 of FIG. 8 and looking in the direction of the arrows.

Referring in greater detail to FIGS. 8 and 11, the upper body or housing section 14 is preferably formed as to provide an integrally formed ear-like projection 94 which functions as a latching means for latchably securing an electrical connector assembly (not shown) which would be electrically connected to terminals 50, 52 and 54 and possibly engage the inner and/or outer cylindrical surfaces of upper portion 24 of housing section 14.

Figure 3:
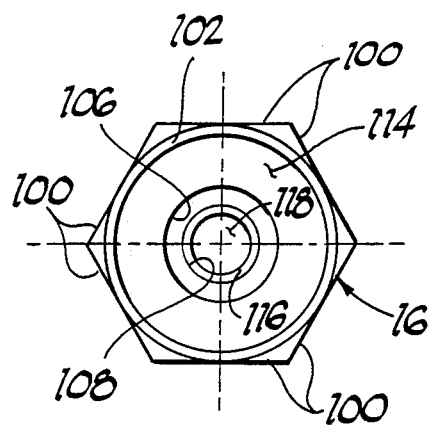
FIG. 3 is a view taken generally on the plane of line 3—3 of FIG. 2 and looking in the direction of the arrows.
Figure 2:
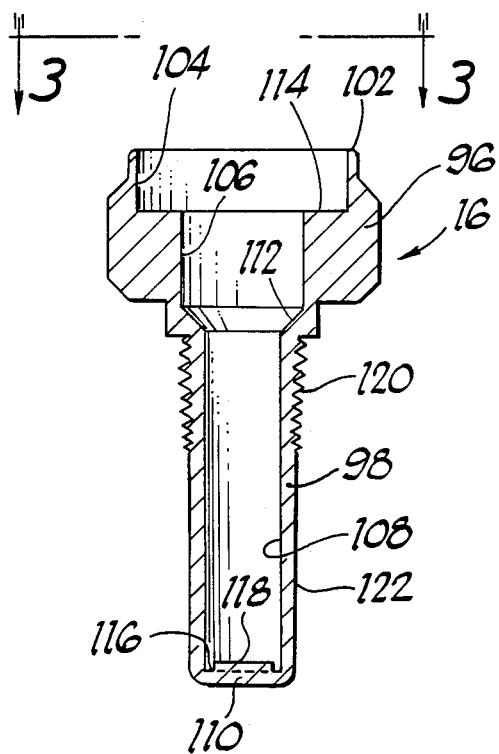
FIG. 2 is an axial cross-sectional view, in relatively reduced scale, of one of the elements shown in FIG. 1.

Referring in greater detail to FIGS. 2 and 3, the lower housing section 16, formed of any suitable electrically conductive material and preferably brass, is illustrated as preferably comprising a relatively enlarged body portion 96 having an integrally formed axially extending generally cylindrical body extension portion 98. The enlarged body portion 96 is provided with a plurality of tool-engaging surface means 100 thereabout and an upwardly directed circular wall portion 102. As best seen in FIG. 2, a relatively large cylindrical counterbore 104 is formed into the upper end of body portion 98 and a second smaller cylindrical passage 106, formed in body 98, extends from counterbore 104 to an axially elongated cylindrical bore or passage 108 which is closed at its lower (as viewed in FIG. 2) end by an integrally formed transverse wall 110. Preferably a generally conical transitional passage 112 serves to functionally interconnect passages 106 and 108. Further, the end of counterbore 104 defines an annular shoulder or flange-like surface 114 generally circumscribing passage 106.

In the preferred embodiment, the passage or bore 108 extends somewhat into end wall portion 110 as to define an annular groove 116 resulting in an inwardly directed cylindrical pilot-like portion 118. The outer surface 122 of extension 98 may be cylindrical and somewhat enlarged as near the upper portion thereof to provide for a threaded portion 120.

Figure 5:
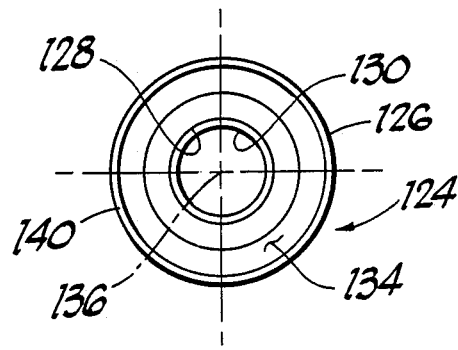
FIG. 5 is a view taken generally on the plane of line 5—5 of FIG. 4 and looking in the direction of the arrows.
Figure 4:
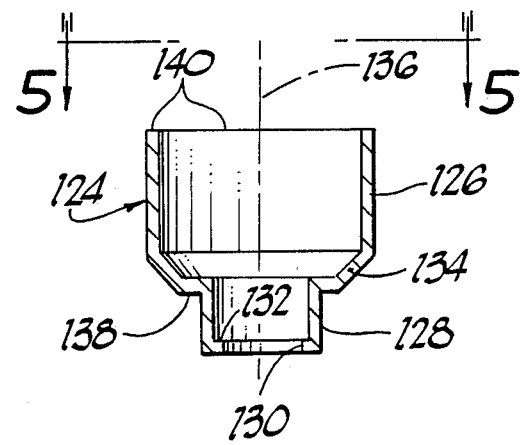
FIG. 4 is an axial cross-sectional view of another of the elements shown in FIG. 1.

Referring to FIGS. 4 and 5, a generally stepped cylindrical sleeve member 124 is illustrated as having a relatively enlarged tubular cylindrical upper body 126 and a smaller tubular cylindrical lower body 128 which, in turn, is preferably provided with a radially inwardly directed flange portion 132 defining an opening 130. The lower end of tubular body 126 is integrally formed with a generally conical transitional portion 134 the lower end of which continues radially inwardly, normal to central axis 136, to join lower tubular portion 128 and define a downwardly directed annular abutment flange or shoulder 138. Preferably, the angle of the conical transitional portion is the same as transitional portion 112 of housing section 116. The upper end of tubular portion 126 is preferably formed as to be a flat surface 140 within a plane normal to axis 136. The sleeve member 124 may be formed of any suitable electrically conductive material and preferably brass.

Figure 7:
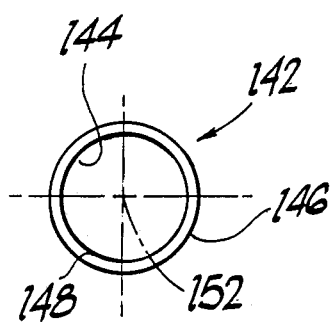
FIG. 7 is a view taken generally on the plane of line 7—7 of FIG. 6 and looking in the direction of the arrows.
Figure 6:
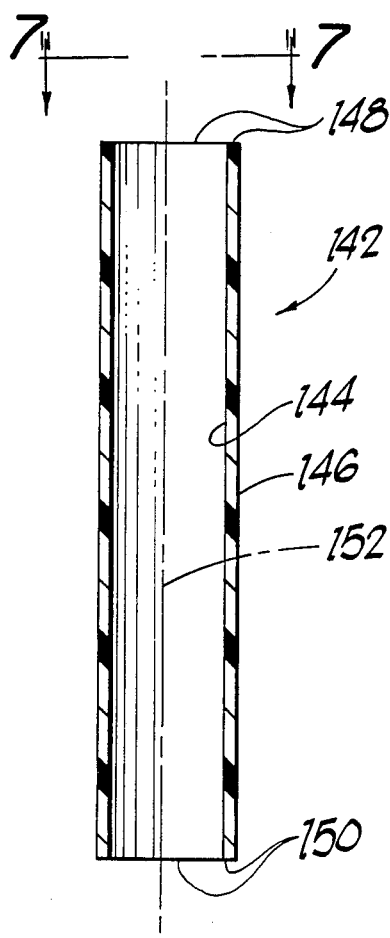
FIG. 6 is an axial cross-sectional view of yet another of the elements shown in FIG. 1.

Referring in greater detail to FIGS. 6 and 7, an electrically insulating cylindrical tubular member 142 is preferably comprised of "Mylar". "Mylar" is a United States of America registered trademark of Du Point de Nemours, E. I. & Co. of Wilmington, Del., for polyester film. As best shown in FIG. 7, the inner cylindrical surface 144 and outer cylindrical surface 146 are preferably substantially concentric and, as depicted in FIG. 6, the ends 148 and 150 are each formed as to be in respective planes preferably normal to the axis 152.

Referring in greater detail to FIG. 1, it can be seen that when the various elements, as those of FIGS. 2–18, are assembled, the electrically insulating tubular member 142 is closely received within bore 108 of lower housing section 16 in a manner whereby the lower end, as 150, is generally piloted by portion 118 and received in the circular groove 116 of housing section 16. A thermistor 154 is received within insulator tube 142 and seated against the axial end surface of pilot portion 118. In the embodiment disclosed, the thermistor 154 is of generally disk-like configuration having an outer cylindrical surface 156 and opposed axial end surfaces 158 and 160.

A coiled electrically conductive compression sprig 162, also received within insulator tube 142 and extending generally along tube 142, has its lower (as viewed in FIG. 1) end 164 in electrically conductive engagement with thermistor 154 as by contacting surface 158 thereof.

A second thermistor 166 is also received generally within the coils of spring 162 in a manner as not to be conductive with spring 162. More particularly, thermistor 166 is provided with a pair of electrical leads or conductors 168 and 170, respectively provided with sections of tubular insulation 172 and 174, which have their respective end portions 176 and 178 secured to terminals 50 and 54 as by crimped portions 66 and 68.

Generally, in assembling the various elements, after the tubular insulator 142 and thermistor 154 are inserted into bore 108, the spring 162 is inserted and at that time the free length of spring 162 is such as to have its upper end 180 extending upwardly beyond that position depicted in FIG. 1. When the tubular sleeve 124 is assembled, the lower cylindrical portion 128 thereof is received within insulator tube 142 and in so doing the end or flange portion 132 engages end 180 of spring 162 and compresses spring 162 until the annular abutment surface 138 of sleeve 124 abuts against upper end 148 of tubular insulator 142 thereby assuming the position depicted in FIG. 1.

The thermistor 166, and its electrical leads, are preferably already assembled to the contacts 50 and 52 carried by upper housing section 14 thereby forming, in effect, a sub-assembly. Such sub-assembly is then assembled to lower housing section 16, and elements carried therein, by passing the thermistor 166, and its leads, through clearance passage 130 of sleeve 124 and, in effect, inserting such thermistor 166 and leads 168 and 170 into the space surrounded by the coils of spring 162.

As such movement continues the lower portion 20 of body section 14 is guidingly received by counterbore 104, of housing section 16, which contains a previously placed annular gasket 182 comprised as of asbestos with a rubber binder. The generally inward movement of the sub-assembly continues, during which the outer cylindrical surface 49 of pilot portion 48 of upper housing section 14 is closely received within body portion 126 of sleeve 124, until surfaces 84 and 82 of respective projecting end portions of legs 80 and 78 of terminal 52 sufficiently engage the upper end surface 140 of sleeve 124. When such engagement occurs, the boss or projection 86, as by its surface 88, also engages the upper end surface 140 of sleeve 124. This effectively provides for a structural three-point engagement as between the sleeve 124 and the upper housing section. With the various elements then in the position as generally depicted in FIG. 1, and gasket 182 being sufficiently squeezed to provide for sealing, the upward projecting wall 102 (shown in FIG. 2) of housing section 16 is spun-over against annular flange or shoulder 22 (as depicted in FIG. 1) thereby holding the various elements in an assembled condition.

OPERATION OF INVENTION

The sensor assembly of the invention may, of course, be employed in any electrical environment; for purposes of illustration the sensor assembly 10 is shown as operatively connected to circuit means 184, 186 and 188. Circuit means 184 is illustrated as comprising electrical load means 190, electrically grounded as at 192, and conductor means 194 leading from load means 190 as to contact or terminal 50. Circuit means 186 is illustrated as comprising electrical load means 196 having first conductor means 198, leading as to a terminal 200 of associated switch means 202, and second conductor means 204 leading from load means 196 as to contact or terminal 52. Circuit means 188 is illustrated as comprising conductor means 206 electrically connected to conductor means 198 and to contact or terminal 54. A source of electrical potential 208 is electrically grounded as at 210 and has electrical conductor means 212 electrically connected to the switch means 202. Another electrical path is illustrated as being established by lower housing section 16 and associated structure 214 leading to electrical ground as at 216. For purposes of illustration, structure 214 may be considered as a fragmentary portion of a vehicular engine with the passage 218 formed therein comprising a portion of the coolant passageway of the engine cooling system. Normally, the liquid coolant 220 would fill such passage 218. Further, it may be assumed that switch means 202 is operated in relationship to the vehicle engine ignition switch means.

With the foregoing in mind, let it be assumed that the switch 202 is closed and the associated vehicular engine is operating. At this time it can be seen that a circuit is completed from source 208, switch 202, conductor means 206, terminal 54, conductor 170, thermistor 166, conductor 168, terminal 50, conductor means 194, load 190 and back to ground as at 192. In this circuit, the thermistor 166 is actually between the source 208 and the electrical load and the resistance of thermistor 166, determined by the sensed temperature of the coolant liquid 220, will determine the magnitude of the voltage to load 190.

The other circuit may be considered as a grounding circuit whereby the thermistor 154 conducts directly to ground. More particularly, with switch means 202 closed, a circuit is completed from source 208, through conductor means 198, electrical load 196, conductor means 204, terminal 52, projecting ends of legs 80, 78, tubular sleeve 124, coil spring 162 and thermistor 154 to housing section 16 which may be considered as at ground potential because of its connection with structure 214.

As should now be apparent, two separate circuits are actually formed within the sensor assembly 10 and such circuits are each responsive to the same monitored temperature and yet are capable of producing differing varying electrical resistance values, in response to the same magnitude of sensed monitored temperature, as to be thereby effective for corrrespondingly effecting or modifying the operation of two operationally unrelated electrical loads.

It can be appreciated that the invention provides means whereby what, in the broad sense, would have required the prior art to employ at least two sensor assemblies, can now be accomplished with a single sensor assembly thereby saving room as on the vehicular engine for the placement of other gauges, senders etc.

Another outstanding feature of the invention is that while providing, in effect, multiple sensing and sending functions, it can be made physically very small. For example, in one successful embodiment of the invention, the diameter of housing section bore 108 was only 5.33 mm., the axial length of bore 108, including the annular groove 116, was only 28.1 mm., the outer diameter of housing 16 extension 98 was only 8.50 mm. and the threaded portion 120 was only a ⅛-27 NPTF. This, clearly indicates that the invention has the ability to be truly considered a miniature in the field of thermal sensor assemblies.

Further, as is now apparent, the invention also provides an overall structure which is easily assembled without the necessity of having to be concerned with relative angular relationships, as among the various elements, with regard to the central axis 224 thereof. More particularly, it is obvious that because of the tubular cylindrical configuration of insulator member 142, it will perform its insulating function regardless of its angular position relative to electrically conductive extension portion 98 of housing section 16. Thermistor 154 being conductive across its opposed faces 158 and 160 can be received within insulator member 142 and against the surface of portion 118 in any relative angular position with respect thereto. Electrically conductive spring 162, of course, is not dependent upon any particular relative angular position since it is effectively radially contained within insulator member 142, as not to contact conductive housing section 16, and serves to complete an electrical path from conductive sleeve 124 to thermistor 154.

The sleeve 124 requires no particular angular relationship relative to either axis 224, housing section 16 or insulator member 142 because it is rotatably seatable onto the end of insulator member 142 and it doesn't matter where the actual contact between sleeve 124 and spring 162 occurs.

Finally, since thermistor 166 and conductors 168 and 170 form no part of the circuitry comprising spring 162 and thermistor 154, and since the projecting ends of terminal legs 78 and 80 may contact the upper end of conductive sleeve 124 anywhere along the upper end thereof, the sub-assembly comprised of body or housing section 14, terminals 50, 52 and 54, conductors 168 and 170 and thermistor 166 can be assembled in any angular relationship, about axis 224, with respect to the remaining elements of the assembly 10.

Further, and still with reference to primarily FIG. 1, the projecting end portions of terminal legs 78 and 80 are prevented from contacting electrically conductive housing section 16 by virtue of the centering-like action of lower portion 20, of housing section 14, diametrically confined within bore 104 of housing section 16. The electrically conductive sleeve 124 is precluded from contacting electrically conductive housing section 16 by the centering-like action of the pilot portion 48, of housing section 14, at the upper end thereof and, at the lower end thereof, by the insulator member 142 which receives portion 128 of sleeve 124. Also, the sleeve 124 is precluded from contacting electrically conductive housing section 16, as in a downward direction (as viewed in FIG. 1) by the upper edge 148 of insulator member 142 engaging annular abutment surface 138 of sleeve 124. Consequently, sleeve 124 is maintained effectively spaced from housing section 16 as to preclude direct electrical contact therebetween.

Although only a preferred embodiment of the invention has been disclosed and described, it is apparent that other embodiments and modifications of the invention are possible within the scope of the appended claims.

What is claimed is:

1. A thermal sensor assembly, comprising housing means, said housing means comprising a first probe-like housing section and a second housing section, wherein said first housing section is intended for placement into a medium the temperature of which is to be monitored, a plurality of electrical terminal means carried by said second housing section for connection to associated electrical circuit means, first thermistor means situated within said first housing section as to be responsive to the temperature of said monitored medium, first electrical conductor means electrically interconnecting said first thermistor means to a first of said plurality of electrical terminal means, second electrical conductor means electrically interconnecting said first thermistor means to a second of said plurality of electrical terminal means, wherein said first and second electrical conductor means said first and second electrical terminal means and said first thermistor means comprise a series electrical circuit portion for connection to said associated electrical circuit means, second thermistor means situated within said first housing section as to be responsive to the temperature of said monitored medium, and third electrical conductor means electrically interconnecting said second thermistor means to a third of said plurality of electrical terminal means, wherein said second thermistor means is in electrically conductive relationship with said first housing section, wherein said first housing section is effective to be placed at electrical ground potential, and wherein said third electrical terminal means is effective for electrical connection to said associated electrical circuit means.

2. A thermal sensor assembly according to claim 1 wherein said second housing section is comprised of dielectric material.

3. A thermal sensor assembly according to claim 1 wherein said first housing section comprises a longitudinally extending housing portion, a longitudinally extending bore formed in said housing portion, an end wall carried by said housing portion and closing one end of said bore, wherein said second thermistor means is situated in said bore as to be in electrically conductive relationship to said housing portion, and wherein said third electrical conductor means comprises spring means electrically connected to said second thermistor means and to said third electrical terminal means.

4. A thermal sensor assembly according to claim 3 wherein said first thermistor means is situated in said bore and located as to be physically between said second thermistor means and said plurality of electrical terminal means.

5. A thermal sensor assembly according to claim 4 wherein said spring means comprises a longitudinally extending coiled compression spring, and wherein said first thermistor means is situated within said coiled compression spring as to have the coils of said coiled compression spring generally diametrically thereabout.

6. A thermal sensor assembly according to claim 5 and further comprising longitudinally extending tubular electrical insulator means situated within said bore, said insulator means generally circumscribing said coiled compression spring as to be between said coiled compression spring and the surface comprising said bore.

7. A thermal sensor assembly according to claim 3 wherein said second thermistor means is in contact with said end wall thereby establishing said electrically conductive relationship to said housing portion.

8. A thermal sensor assembly according to claim 7 and further comprising tubular electrical insulator means situated within said bore, said insulator means generally circumscribing said second thermistor means as to be generally between said second thermistor means and the surface of said bore.

9. A thermal sensor assembly according to claim 3 wherein said third electrical conductor means comprises generally tubular electrically conductive sleeve means, wherein said third electrical terminal means comprises a terminal portion engageable with a first end portion of said sleeve means, wherein said spring means is engageable with a second end portion of said sleeve means, and wherein said first and second conductor means extend through said second end portion and into said sleeve means.

10. A thermal sensor assembly according to claim 9 and further comprising longitudinally extending tubular electrical insulator means situated within said bore, wherein said insulator means generally circumscribes said spring means as to be between said spring means and the surface comprising said bore, and wherein said sleeve means axially abutingly operatively engages an end portion of said tubular electrical insulator means.

11. A thermal sensor assembly according to claim 10 wherein at least a part of said second end portion of said sleeve means is closely received within said end portion of said tubular electrical insulator means.

12. A thermal sensor assembly according to claim 11 wherein said first and second terminal means respectively comprise first and second electrical conductor connecting portions, and wherein said first and second electrical connecting portions are situated within and electrically isolated from said sleeve means.

13. A thermal sensor assembly according to claim 9 wherein said second housing section comprises axially extending pilot means, and wherein said pilot means is in operative engagement with said first end portion of said sleeve means.

14. A thermal sensor assembly according to claim 3 wherein said third electrical conductor means comprises generally tubular electrically conductive sleeve means, wherein said third electrical terminal means comprises at least first and second leg portions, wherein said first and second leg portions are engageable with a first end portion of said sleeve means, and wherein said spring means is engageable with a second end portion of said sleeve means.

15. A thermal sensor assembly according to claim 14 wherein said second housing section comprises axially extending pilot means having an outer circumscribing surface, wherein each of said first and second leg portions extend beyond said outer circumscribing surface, wherein said pilot means is at least in part received in said first end portion of said sleeve means, and wherein said first and second leg portions by extending beyond said outer circumscribing surface engage said first end portion of said sleeve means when said pilot means is received in said first end portion of said sleeve means.

16. A thermal sensor assembly according to claim 15 and further comprising boss means carried by said second housing section, said boss means being situated as to engage said first end portion of said sleeve means and thereby in cooperation with said first and second leg portions establish a three point mechanical interconnection with said sleeve means.

* * * * *